United States Patent
Wang et al.

(10) Patent No.: US 8,928,678 B2
(45) Date of Patent: Jan. 6, 2015

(54) MEDIA WORKLOAD SCHEDULER

(75) Inventors: Changliang Charlie Wang, Bellevue, WA (US); Venkataraman Radhakrishnan, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 226 days.

(21) Appl. No.: 13/564,824

(22) Filed: Aug. 2, 2012

(65) Prior Publication Data
US 2014/0035938 A1 Feb. 6, 2014

(51) Int. Cl.
*G06F 13/14* (2006.01)
(52) U.S. Cl.
USPC .......................................... 345/520; 345/501
(58) Field of Classification Search
CPC ................. G06F 11/3447; G09G 2360/08
USPC ................................... 345/520, 501
See application file for complete search history.

(56) References Cited

U.S. PATENT DOCUMENTS

| | | | |
|---|---|---|---|
| 7,466,316 B1 * | 12/2008 | Alben et al. | 345/502 |
| 2003/0007566 A1 | 1/2003 | Peng et al. | |
| 2003/0058942 A1 | 3/2003 | Hentschel et al. | |
| 2005/0012861 A1 | 1/2005 | Hentschel et al. | |
| 2006/0280484 A1 | 12/2006 | Douniwa | |
| 2007/0014363 A1 | 1/2007 | Golas et al. | |
| 2010/0064055 A1 | 3/2010 | Krikorian et al. | |
| 2010/0268813 A1 * | 10/2010 | Pahlavan et al. | 709/224 |
| 2011/0060932 A1 * | 3/2011 | Conroy et al. | 713/340 |
| 2012/0044254 A1 | 2/2012 | Watanuki et al. | |
| 2014/0022266 A1 * | 1/2014 | Metz et al. | 345/522 |

OTHER PUBLICATIONS

Extended European Search Report in relation to European Patent Application No. 13178891.1, mailed Mar. 17, 2014, 6 Pages.

* cited by examiner

*Primary Examiner* — Maurice L McDowell, Jr.
(74) *Attorney, Agent, or Firm* — International IP Law Group, P.L.L.C.

(57) ABSTRACT

A method and system for scheduling a media workload is disclosed herein. The method includes modeling a feature of the media workload. A GPU utilization rate and a memory bandwidth of the media workload may be determined. Additionally, the media workload may be scheduled by modifying the feature of the media workload in order to adjust the GPU utilization and the memory bandwidth.

20 Claims, 8 Drawing Sheets

300

MEDIA WORKLOAD SCHEDULER

TECHNICAL FIELD

The present invention relates generally to adjusting a workload. More specifically, the present invention relates to adjusting a media workload on a graphics processing unit (GPU).

BACKGROUND ART

Media workloads can be relatively large and can fully utilize GPU time and memory bandwidth. A media workload includes one or more data streams obtained by a media application from media components of an electronic device, such as a camera or video player. As used herein, media refers to any data processed by the GPU. For example, tablets and smart phones may contain two or more cameras in order to support video capture, with at least one front and one rear facing camera. The cameras may be used simultaneously. Each camera has its own data stream, with the processing for each data stream including encoding and decoding then data stream. In examples, a computing device may be used for a video conference with multiple participants, with each participant having its own data stream that is encoded and decoded.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
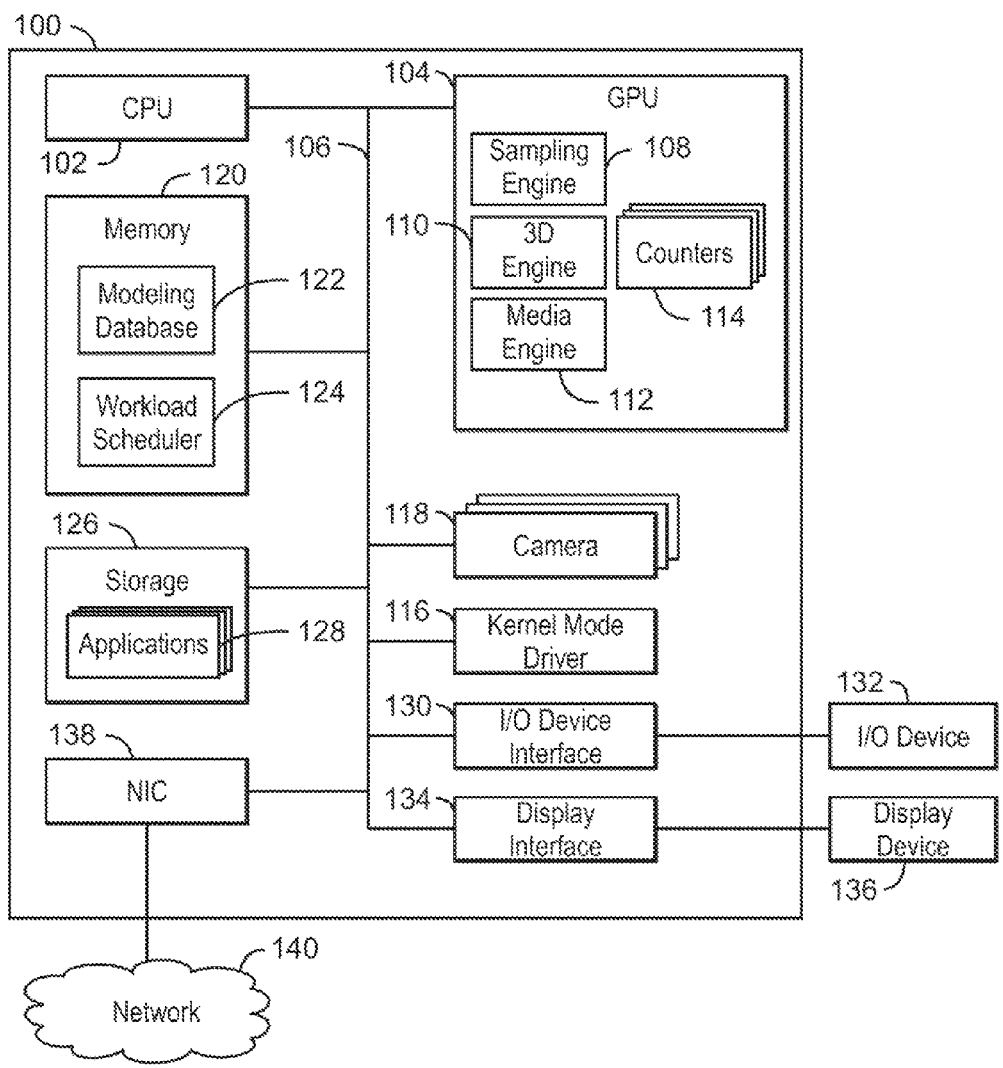
FIG. 1 is a block diagram of a computing device that may be used to schedule workloads, in accordance with embodiments.

The GPU may be used for various media functions, such as media playback and 3D applications. Many uses of the GPU include encoding and decoding multiple data streams. As used herein, media refers to any graphics content composed of various data streams, such as online video broadcasts or video conferencing images. As discussed above, the media workload for the GPU may be relatively large. When the media workload exceeds certain thresholds, a bottleneck may occur. The thresholds may include a maximum throughput capacity for the GPU. A bottleneck can cause disruptions in GPU data processing, resulting in degraded media functions. For example, the playback of a video may be compromised and include a lag in the video playback, or several starts and stops within the playback. Accordingly, embodiments described herein relate to the scheduling of a media workload. The media workload may be automatically adjusted based on a GPU utilization rate and a memory bandwidth.

Video standards such as those by the Moving Picture Experts Group (MPEG) and H.264 compress a video stream by processing the stream frame-by-frame. A frame is still image of the video, similar to a picture. Each frame may be subdivided into macroblocks, and the macroblocks may be further divided into slices. A macroblock is typically a block of pixels. For example, in the H.264 standard, a macroblock is sixteen by sixteen pixels in size. A slice is a unit of data within the frame that is independently encodable or decodable. Thus, if one slice of a frame is lost, the other slices of the frame are still decodable. In embodiments, slices can be used for parallel encoding and decoding, as they are independent from other slices in the picture. A slice header may include address information for at least a portion of the slices in a frame. The address information enables identification of the beginning position of the slices. Other information may be included in the slice header, including any filter information associated with the slice as well as the coding type of the slice, such as MPEG or H.264.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 that may be used to schedule workloads, in accordance with embodiments. The computing device 100 may be, for example, a laptop computer, desktop computer, tablet computer, mobile device, server, or cellular phone, among others. The computing device 100 may device 100 includes a central processing unit (CPU) 102 that is configured to execute stored instructions, as well as a memory device 104 that stores instructions that are executable by the CPU 102. The CPU 102 can be a single core processor, a multi-core processor, a computing cluster, or any number of other configurations. Furthermore, the computing device 100 may include more than one CPU 102. The instructions that are executed by the CPU 102 may be used to schedule a media workload.

The computing device 100 may also include a graphics processing unit (GPU) 104. As shown, the CPU 102 may be connected through a bus 106 to the GPU 104. However, in some embodiments, the CPU 102 and the GPU 104 are located on the same die. The GPU 104 may be configured to perform any number of graphics operations within the computing device 100. For example, the GPU 104 may be configured to render or manipulate graphics images, graphics frames, videos, or the like, to be displayed to a user of the computing device 100.

The GPU 104 may also include a sampling engine 108, a 3D engine 110, and a media engine 112. An engine is a component of the GPU 104 that may be used for parallel processing of data sent to the GPU 104. Although three GPU engines are shown, the GPU may contain any number of engines. For example, the GPU 104 may include a render engine and a multi-format CODEC (MFX) engine. As shown in the computing device 100, the 3D engine 110 may process 3D image data in parallel with the media engine 114 that processes other types of media. The sampling engine 108 may collect data from GPU counters 114. Additionally, in embodiments, the render engine may process 3D image data while the MFX engine decodes data sent to the GPU 104. The GPU counters 114 may collect performance data related to the GPU 104. Specifically, a GPU counter 114 may measure the load and throughput of the GPU 104. The sampling engine 108 may send the GPU performance data from the GPU counters 114 to a kernel mode driver (KMD) 116. The KMD 116 may calculate a GPU utilization rate and memory bandwidth based on data from the GPU counters 114.

The computing device 100 includes one or more cameras 118. As discussed above, a cellular phone may have two front facing cameras and one rear facing camera. The multiple cameras may be used to capture video. Additionally, the computing device 100 includes a memory device 120. The memory device 120 can include random access memory (RAM), read only memory (ROM), flash memory, or any other suitable memory systems. For example, the memory device 120 may include dynamic random access memory (DRAM).

The memory device 120 includes a media feature modeling database 122. The media feature modeling database 122 includes a set of features that may be modified in order to adjust the GPU utilization rate and memory bandwidth of a media workload, according to embodiments. The media feature modeling database 122 may be modeled offline or in real time.

Several features may be included in the media feature modeling database 122. Each feature may modify some aspect of the media workload, such as decoding, video processing, encoding, or memory accesses. In embodiments, the media workload may be decoded or encoded using a CODEC. Accordingly, a decoding feature or an encoding feature may be modified by modifying the corresponding CODEC.

In examples, the decoding aspect of the media workload may be modified by disabling in-loop de-blocking using a slice header, or by skipping bi-predicted frames (B-frame) or predicted frames (P-frame) during decoding. In-loop de-blocking is a video filter applied to each slice when decoding media playback in order to improve visual quality of the video and prediction performance by smoothing sharp edges that can form between slices when block coding techniques are used. As discussed above, a slice is a unit of data within each frame that is encoded or decoded. Each slice may contain a header with information regarding the slice such as the encoding or decoding format of the slice, among others. In-loop de-blocking may be disabled by removing the de-blocking filter information contained in the header of each slice. By disabling this feature, the portion of the media workload used for decoding may be reduced.

The portion of the media workload used for decoding may also be reduced by skipping B-frames or P-frames while decoding the video of the media workload. As discussed above, each frame is a still picture that is displayed in succession with other frames to render the entire video. Various frame types can be used in order to compress the entire video, including predicted picture frames (P-frames) and bi-predicted picture frames (B-frames). A P-frame encodes the changes in the image that occur when compared to the previous frame. Thus, when the video is a ball that bounces across a static background, the movement of the ball is encoded, without encoding the static background. The size of the encoded file is thereby reduced when compared to the encoding the entire frame, including the static background. A B-frame compares the current frame with the previous frame, and encodes the changes between the two frames in order to encode with video information. Thus, when the video is a ball that bounces across a static background, the changed location of the ball is encoded, without encoding the static background. When the video is encoded using P-frames or B-frames, several P-frames or B-frames may be skipped when decoding the video in order to reduce the media workload. Skipping several, non-sequential P-frames or B-frames when decoding a video may reduce the GPU utilization of the media workload and is generally undetectable by human eyes.

Decoding may occur during various uses, including but not limited to high definition playback, WiDi playback, or during video conferencing. Further, in examples, in-loop de-blocking is disabled prior to skipping B-frames or P-frames during decoding. When in-loop de-blocking is disabled, the reduction in video quality is typically very minimal when compared to the reduction in video quality that occurs when skipping B-frames or P-frames during decoding. Accordingly, disabling in-loop de-blocking first may be desirable due to its smaller impact on video quality when compared to the reduction in video quality when skipping B-frames or P-frames during decoding.

One or more video processing features such as image stabilization, frame rate conversion, gamma correction enhancement, skin tone enhancement, frame rate reduction, and frame size may also be modified in order to adjust the media workload. For example, by reducing the frame rate or frame size of the of the data, the GPU utilization rate may be reduced, thereby enabling the GPU to process the data streams without degradation in media playback that is perceived by the user. Video processing occurs during various uses, including but not limited to high definition playback, WiDi playback, or during video conferencing. In examples, when video processing features are modified, frame rate conversion may be disabled prior to disabling other video processing features. This is because frame rate conversion is typically a lengthy step within the GPU pipeline. After the frame rate conversion has been disabled, image stabilization may be disabled to further reduce the media workload. Image stabilization may also take a large portion of GPU time. After the image stabilization has been disabled, gamma correction enhancement and skin tone enhancement may be disabled. Finally, in examples, the remaining features, such as frame rate reduction and frame size may be disabled. By disabling video processing features in the order described above, the features may be disabled in a manner that has the least effect on image quality while reducing the GPU utilization rate.

Encoding features such as bit rate, motion estimation, and macroblock shape may be modified in order to adjust the portion of the media workload used to encode a video signal. Specifically, features such as the bit rate of the data being processed by encoding may be reduced, while motion estimation techniques such as flash media encoding (FME) and hierarchical motion estimation (HME) may be turned on or off in response to a high GPU utilization due to encoding. The macroblock shape may also be modified. For example, the macroblock may have a different size, such as sixteen by sixteen pixels or eight by eight pixels.

In examples, during encoding the bit rate may be lowered prior to adjusting other features of the media workload. The bit rate may consume a large amount of the GPU time, and lowering the bit rate may decrease the GPU time used for encoding. In examples, after the bit rate has been lowered, the motion estimation complexity may be lowered, thereby reducing the GPU time used for motion estimation. Finally, in examples, after the motion estimation complexity has been lowered, the macroblock shape may be changed in order to modify the media workload. Similar to the video processing features, by disabling the encoding features in the order described above, the features may be disabled in a manner that has the least effect on image quality while reducing the GPU utilization rate.

Memory bandwidth may also be reduced by modifying features of the media workload. For example, some workloads may use a large portion of memory, while other workloads use less memory. The workloads may be limited by the bandwidth of memory available as data is retrieved from memory. Accordingly, by reducing the number of execution unit threads on the GPU, the media workload may be reduced to avoid any jitters, lags, or freezes in GPU performance as a result of limited memory bandwidth. Other features that affect the memory bandwidth may also be modified. In examples, the features the affect the memory bandwidth may be modified in an order where the features that use the most memory bandwidth are disabled prior to the remaining features.

The memory device 120 may also include a workload scheduler 124 that adjusts the workload based on GPU and memory input. In embodiments, the workload scheduler 124 may communicate to the sampling engine 108 and the media feature modeling database 122 in order to determine which feature of the media workload to modify in real time. In this manner, a GPU utilization rate and memory bandwidth is achieved that enables maximum use of the GPU without compromising the performance of the GPU as perceived by the user. The workload may then be sent from the workload scheduler 124 to be processed as discussed in FIG. 2, and then sent to the GPU 104.

The computing device 100 may include a storage 126. The storage 126 is a physical memory such as a hard drive, an optical drive, a thumbdrive, an array of drives, or any combinations thereof. The storage 126 may also include remote storage drives. The storage may also include one or more media applications 128.

The CPU 102 may also be connected through the bus 106 to an input/output (I/O) device interface 130 configured to connect the computing device 100 to one or more I/O devices 132. The I/O devices 132 may include, for example, a keyboard and a pointing device, wherein the pointing device may include a touchpad or a touchscreen, among others. The I/O devices 132 may be built-in components of the computing device 100, or may be devices that are externally connected to the computing device 100.

The CPU 102 may also be linked through the bus 106 to a display interface 134 configured to connect the computing device 100 to a display device 136. The display device 136 may include a display screen that is a built-in component of the computing device 100. The display device 136 may also include a computer monitor, television, or projector, among others, that is externally connected to the computing device 100. A network interface controller (NIC) 138 may be configured to connect the computing device 100 through the bus 106 to a network 140. Network 140 can be a wire line network, a wireless network, or a cellular network. The network 140 may be any wide area network (WAN), any local area network (LAN), or the Internet, among others. For example, network 140 can be 3GPP LTE network or a WiFi network.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
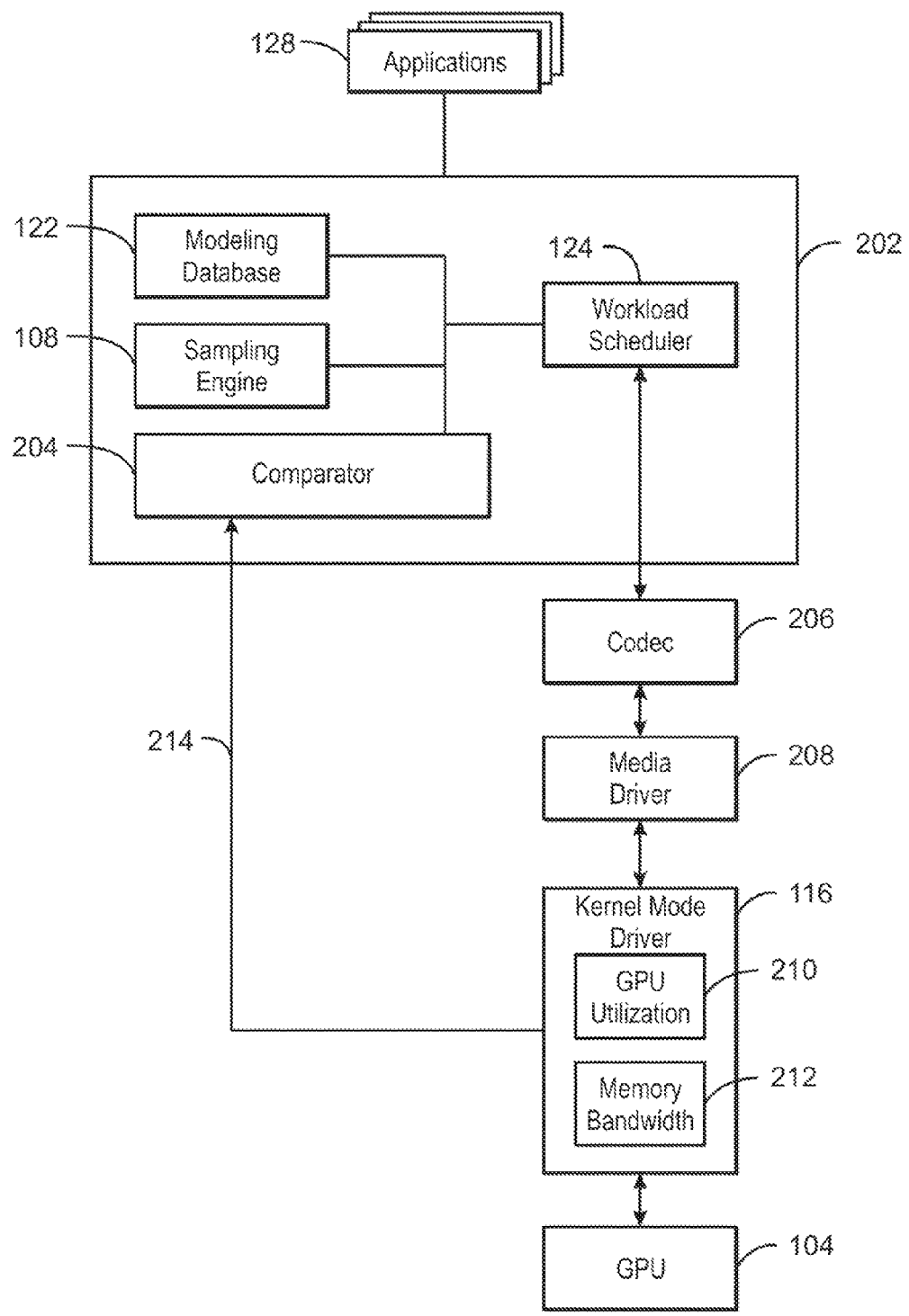
FIG. 2 is a schematic of a system that may be used to schedule a media workload, in accordance with embodiments.

FIG. 2 is a schematic of a system 200 that may be used to schedule a media workload, in accordance with embodiments. Like numbered items are as described with respect to FIG. 1. The system 200 may include media applications 126. The media applications 126 may include applications that play movies, video conferencing software, or camera software, among others. The workloads from the media applications 126 may be sent to a scheduling component 202. The scheduling component 202 includes a media feature modeling database 122, sampling engine 108, a workload scheduler 124, and a comparator 204. As described with regard to FIG. 1, the workload scheduler 124 may communicate to the sampling engine 108 and the media feature modeling database 122 in order to determine which feature of media workload to modify in real time in order to adjust the GPU utilization rate and the memory bandwidth. If the GPU utilization rate or the memory bandwidth is below a threshold, the comparator 204 will send a message to the workload scheduler 124 that no modification of the media workloads from the applications 128 should occur. When the GPU utilization rate or the memory bandwidth is above a threshold, the comparator 204 will send a message to the workload scheduler 124 that the media workloads should be modified. For example, if the GPU utilization rate is above a threshold of 95%, then the media workloads may be modified. Similarly, when a percentage of the memory bandwidth is exceeded, bandwidth may be used as a threshold. Accordingly, when the threshold of five gigabytes per second is exceeded, then the media workloads may be modified.

The workloads may be sent from the scheduling component 202 to a CODEC 206. A CODEC is a software or hardware component of a computing device that can convert the media workloads into a format that can be processed by the GPU. The converted workload is then sent to a media driver 208. In embodiments, the media driver 208 places the converted workload into a buffer. A KMD 116 may be used to calculate a GPU utilization rate 210 as well as the memory bandwidth 212 of the converted workload. Additionally, hardware, such as the GPU 104, may process the converted workloads from the buffer.

The KMD 116 also sends the calculated GPU utilization rate 210 as well as the memory bandwidth 212 as feedback 214 to the scheduling component 202. The feedback 214 is used by the comparator 204 in order to determine if the GPU utilization rate 210 or the memory bandwidth 212 is above or below a particular threshold. As discussed above, the workload scheduler may modify the media workloads based on results from the comparator 204.

Figure 3:
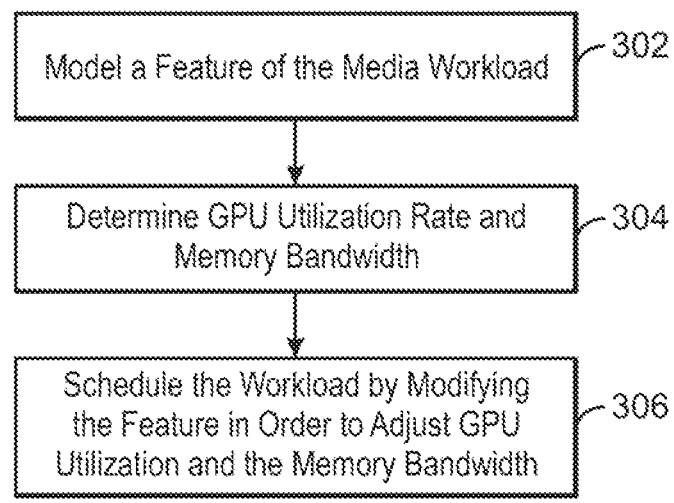
FIG. 3 is a process flow diagram showing a method for scheduling a media workload, in accordance with embodiments.

FIG. 3 is a process flow diagram showing a method 300 for scheduling a media workload, in accordance with embodiments. In various embodiments, the method 300 may be executed on a computing device, such as the computing device 100. In other embodiments, the method 300 may be executed using a system such as system 200 discussed above with respect to FIG. 2.

The method begins at block 302 by modeling a feature of the media workload. In embodiments, the feature is any aspect of the workloads processed by the GPU or any of the GPU engines that may be adjusted in order to prevent or resolve a data processing bottleneck of the GPU. A data processing bottleneck may occur when the GPU utilization rate is higher than a threshold, or the memory bandwidth is higher than a threshold. Furthermore, in embodiments, the features may be stored in a media feature modeling database.

At block 304, a GPU utilization rate and a memory bandwidth of the media workload may be determined. As discussed above, the GPU utilization rate and memory bandwidth may be determined using the kernel mode driver. At block 306, the media workload may be scheduled by modifying the feature of the media workload in order to adjust the GPU utilization and the memory bandwidth. In embodiments, adjusting the GPU utilization rate and the memory bandwidth includes providing dynamic control of the media workload, adjusting encoding and decoding of the media, adjusting video playback, and adjusting parameters of video conferencing, camera functionality, or wireless display functionality. Additionally, in embodiments, features may be removed from the media workload.

Figure 4A:
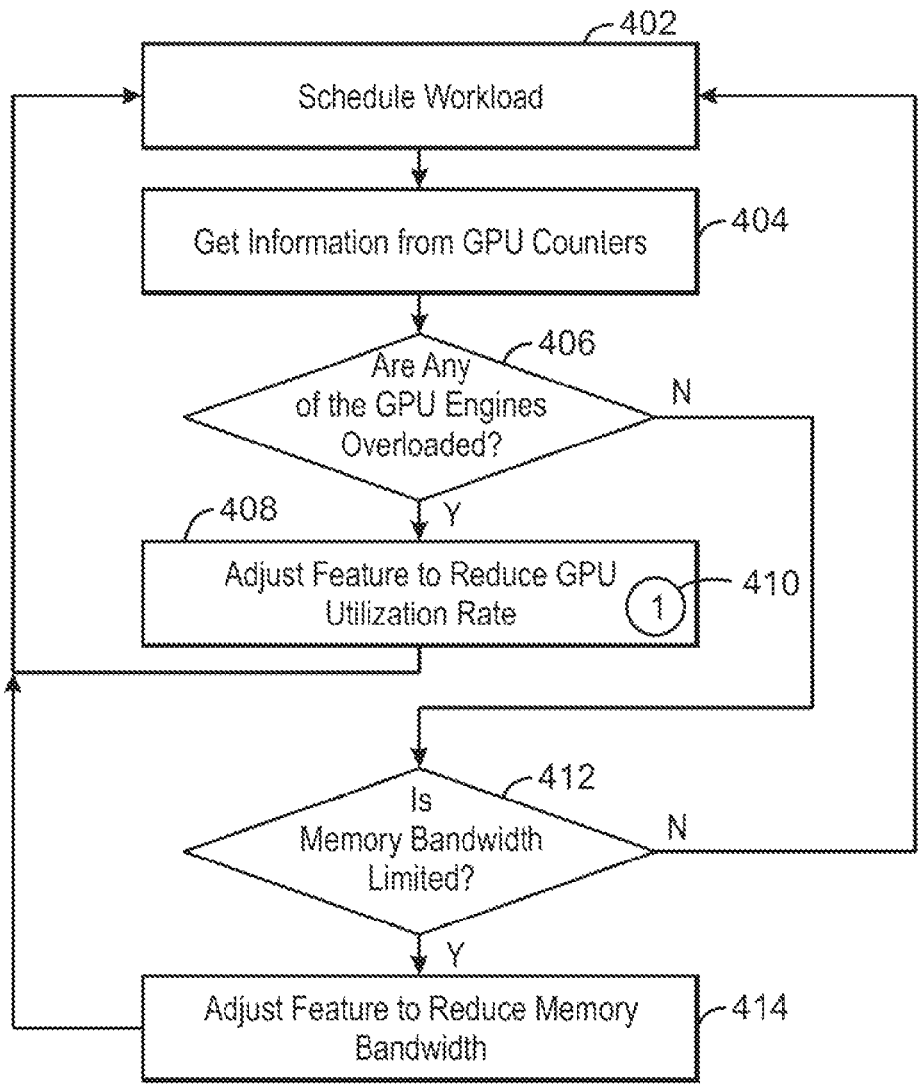
FIG. 4A is a process flow diagram showing a method for scheduling a media workload, in accordance with embodiments.

FIG. 4A is a process flow diagram showing a method 400 for scheduling a media workload, in accordance with embodiments. At block 402, the media scheduler will schedule the workload based on a default setting of each type of usage model. A usage model represents the type of operations performed by the workload. The default settings of a usage model include Settings that enable the operations of the usage model. For example, a video playback operation is one type of usage model. The default settings for a video playback operation may include, but are not limited to, enabling video processing features, performing image stabilization, and providing frame rate conversion. At block 404, information from the GPU counters is obtained. In embodiments, after a few workloads are sent to the GPU, the scheduling component may collect feedback from the GPU counters so that the GPU utilization rate and memory bandwidth can be calculated. Further, in embodiments, the GPU utilization rate can be calculated for each GPU engine. At block 406, the method determines if the GPU or GPU engine is overloaded. If any GPU or GPU engine is overloaded, process flow continues to block 408. If any GPU or GPU engine is not overloaded, process flow continues to block 410.

Figure 4B:
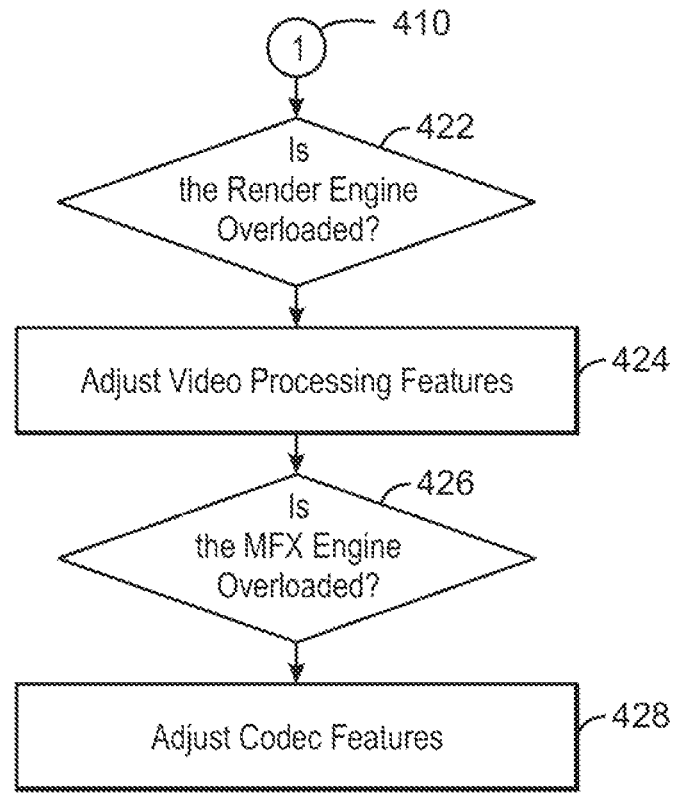
FIG. 4B is a process flow diagram showing a method for adjusting features, in accordance with embodiments.

At block 408, a feature of the media workload is modified in order to reduce the GPU utilization rate. For example, if the 3D engine of the GPU is overloaded such that the utilization rate of the 3D engine is above a pre-determined threshold, then features that reduce the utilization rate of the 3D engine are modified. Process flow may then return to block 402 and schedule the workload. FIG. 4B further describes a method for adjusting features, in accordance with embodiments.

At block 412, it is determined if the memory is bandwidth limited. If the memory bandwidth is limited, process flow continues to block 414. If the memory bandwidth is not limited, then process flow may then return to block 402 and schedule the workload.

At block 414, features may be modified in order to reduce memory bandwidth. In examples, if the media engine is overloaded such that the maximum memory bandwidth is exceeded, features that reduce the memory bandwidth may be modified. Process flow the returns to block 402 to schedule the workload.

FIG. 4B is a process flow diagram showing a method 420 for modifying a feature of the media workload, in accordance with embodiments. At block 422, it is determined if a render engine is overloaded. In examples, the render engine may be an engine of the GPU that renders 3D images. If the render engine of the GPU is overloaded such that the utilization rate of the render engine is above a pre-determined threshold, then process flow continues to block 424.

At block 424, features that reduce the utilization rate of the render engine are modified. At block 426, it is determined if the MFX engine is overloaded. In examples, the MFX engine is an engine of the GPU that decodes various data streams. If MFX engine is overloaded, process flow may continue to block 428.

At block 428, the CODEC features that reduce the utilization rate of the MFX engine are modified. As discussed above, a CODEC is a software or hardware component of a computing device that can convert the media workloads into a format that can be processed by the GPU. In embodiments, the CODEC may be the CODEC 206 (FIG. 2). Additionally, in embodiments, the CODEC may be a component of a GPU engine, such as the MFX engine or the media engine 114 (FIG. 1). Various aspects of the CODEC may be modified in order to reduce the utilization rate of the MFX engine. Process flow may then return to block 402 and schedule the workload.

The process flow diagrams of FIGS. 3, 4A, and 4B are not intended to indicate that the blocks of methods 300 and 400 are to be executed in any particular order, or that all of the blocks are to be included in every case. Further, any number of additional blocks may be included within the methods 300 and 400, depending on the details of the specific implementation.

Figure 5:
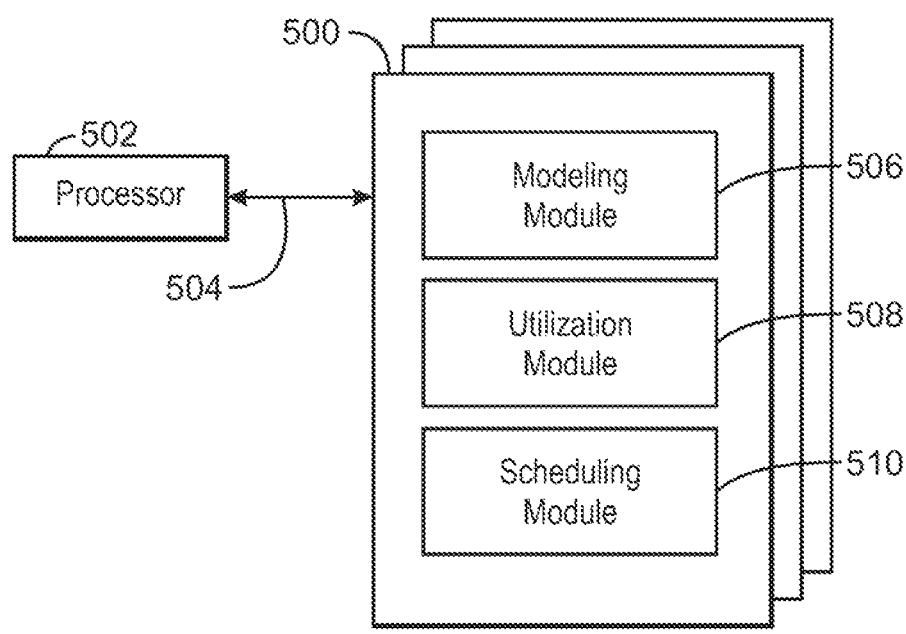
FIG. 5 is a block diagram showing tangible, non-transitory, computer-readable media that stores code for scheduling a media workload, in accordance with embodiments.

FIG. 5 is a block diagram showing one or more tangible, non-transitory computer-readable media 500 that stores code for scheduling a media workload, in accordance with embodiments. Accordingly, one or more computer readable media may store code for scheduling a media workload, in accordance with embodiments. The one or more tangible, non-transitory computer-readable media 500 may be accessed by a processor 502 over a computer bus 504. Furthermore, the one or more tangible, non-transitory computer-readable media 500 may include code configured to direct the processor 502 to perform the methods described herein.

The various software components discussed herein may be stored on the tangible, non-transitory computer-readable media 500, as indicated in FIG. 5. For example, a modeling module 506 may be configured to model a feature of the media workload. A utilization module 508 may be configured to determine a GPU utilization rate and a memory bandwidth of the media workload. Further, a scheduling module 510 may be configured schedule the media workload by modifying the feature of the media workload in order to adjust the GPU utilization and the memory bandwidth.

The block diagram of FIG. 5 is not intended to indicate that the tangible, non-transitory computer-readable media 500 is to include all of the components shown in FIG. 5. Further, the tangible, non-transitory computer-readable media 500 may include any number of additional components not shown in FIG. 5, depending on the details of the specific implementation.

Figure 6:
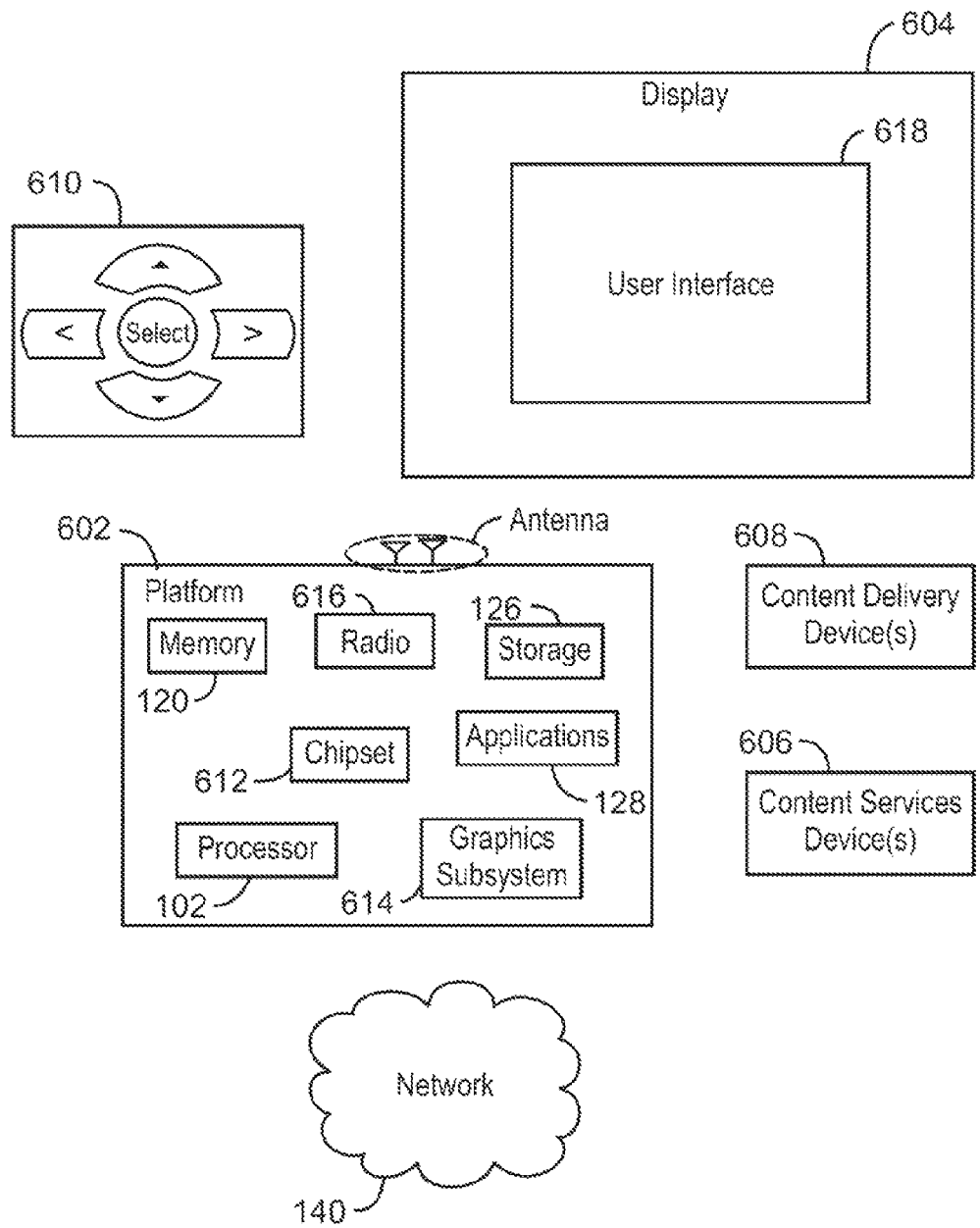
FIG. 6 is a block diagram of an exemplary system for implementing shared physical memory.

FIG. 6 is a block diagram of an exemplary system 600 for implementing shared physical memory. Like numbered items are as described with respect to FIGS. 1 and 2. In some embodiments, the system 600 is a media system. In addition, the system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (, smart phone, smart tablet or smart television), mobile Internet device (MID), messaging device, data communication device, or the like.

In various embodiments, the system 600 comprises a platform 602 coupled to a display 604. The platform 602 may receive content from a content device, such as content services device(s) 606 or content delivery device(s) 608, or other similar content sources. A navigation controller 610 including one or more navigation features may be used to interact with, for example, the platform 602 and/or the display 604. Each of these components is described in more detail below.

The platform 602 may include any combination of a chipset 612, a central processing unit (CPU) 102, a memory device 120, a storage device 126, a graphics subsystem 614, applications 128, and a radio 616. The chipset 612 may provide intercommunication among the CPU 102, the memory device 120, the storage device 126, the graphics subsystem 614, the applications 128, and the radio 616. For example, the chipset 612 may include a storage adapter (not shown) capable of providing intercommunication with the storage device 126.

The CPU 102 may be implemented as Complex Instruction Set Computer (CISC) or Reduced Instruction Set Computer (RISC) processors, x86 instruction set compatible processors, multi-core, or any other microprocessor or central processing unit (CPU). In some embodiments, the CPU 102 includes dual-core processor(s), dual-core mobile processor(s), or the like.

The memory device 120 may be implemented as a volatile memory device such as, but not limited to, a Random Access Memory (RAM), Dynamic Random Access Memory (DRAM), or Static RAM (SRAM). The storage device 126 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 126 includes technology to increase the storage performance enhanced protection for valuable digital media when multiple hard drives are included, for example.

The graphics subsystem 614 may perform processing of images such as still or video for display. The graphics subsystem 614 may include a graphics processing unit (GPU), such as the GPU 104 (FIG. 1), or a visual processing unit (VPU), for example. An analog or digital interface may be used to communicatively couple the graphics subsystem 614 and the display 604. For example, the interface may be any of a High-Definition Multimedia Interface, DisplayPort, wireless HDMI, and/or wireless HD compliant techniques. The graphics subsystem 614 may be integrated into the CPU 102 or the chipset 612. Alternatively, the graphics subsystem 614 may be a stand-alone card communicatively coupled to the chipset 612.

The graphics and/or video processing techniques described herein may be implemented in various hardware architectures. For example, graphics and/or video functionality may be integrated within the chipset 612. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 616 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 616 may operate in accordance with one or more applicable standards in any version.

The display 604 may include any television type monitor or display. For example, the display 604 may include a computer display screen, touch screen display, video monitor, television, or the like. The display 604 may be digital and/or analog. In some embodiments, the display 604 is a holographic display. Also, the display 604 may be a transparent surface that may receive a visual projection. Such projections may convey various forms of information, images, objects, or the like. For example, such projections may be a visual overlay for a mobile augmented reality (MAR) application. Under the control of one or more applications 128, the platform 602 may display a user interface 618 on the display 604.

The content services device(s) 606 may be hosted by any national, international, or independent service and, thus, may be accessible to the platform 602 via the Internet, for example. The content services device(s) 606 may be coupled to the platform 602 and/or to the display 604. The platform 602 and/or the content services device(s) 606 may be coupled to a network 140 to communicate (, send and/or receive) media information to and from the network 140. The content delivery device(s) 608 also may be coupled to the platform 602 and/or to the display 604.

The content services device(s) 606 may include a cable television box, personal computer, network, telephone, or Internet-enabled device capable of delivering digital information. In addition, the content services device(s) 606 may include any other similar devices capable of unidirectionally or bidirectionally communicating content between content providers and the platform 602 or the display 604, via the network 140 or directly. It will be appreciated that the content may be communicated unidirectionally and/or bidirectionally to and from any one of the components in the system 600 and a content provider via the network 140. Examples of content may include any media information including, for example, video, music, medical and gaming information, and so forth.

The content services device(s) 606 may receive content such as cable television programming including media information, digital information, or other content. Examples of content providers may include any cable or satellite television or radio or Internet content providers, among others.

In some embodiments, the platform 602 receives control signals from the navigation controller 610, which includes one or more navigation features. The navigation features of the navigation controller 610 may be used to interact with the user interface 618, for example. The navigation controller 610 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combination thereof. Such physical gestures can be recognized and translated into commands or instructions.

Movements of the navigation features of the navigation controller 610 may be echoed on the display 604 by movements of a pointer, cursor, focus ring, or other visual indicators displayed on the display 604. For example, under the control of the applications 128, the navigation features located on the navigation controller 610 may be mapped to virtual navigation features displayed on the user interface 618. In some embodiments, the navigation controller 610 may not be a separate component but, rather, may be integrated into the platform 602 and/or the display 604.

The system 600 may include drivers (not shown) that include technology to enable users to instantly turn on and off the platform 602 with the touch of a button after initial boot-up, when enabled, for example. Program logic may allow the platform 602 to stream content to media adaptors or other content services device(s) 606 or content delivery device(s) 608 when the platform is turned "off." In addition, the chipset 612 may include hardware and/or software support for 5.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 600 may be integrated. For example, the platform 602 and the content services device(s) 606 may be integrated; the platform 602 and the content delivery device(s) 608 may be integrated; or the platform 602, the content services device(s) 606, and the content delivery device(s) 608 may be integrated. In some embodiments, the platform 602 and the display 604 are an integrated unit. The display 604 and the content service device(s) 606 may be integrated, or the display 604 and the content delivery device(s) 608 may be integrated, for example.

The system 600 may be implemented as a wireless system or a wired system. When implemented as a wireless system, the system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 602 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 6.

Figure 7:
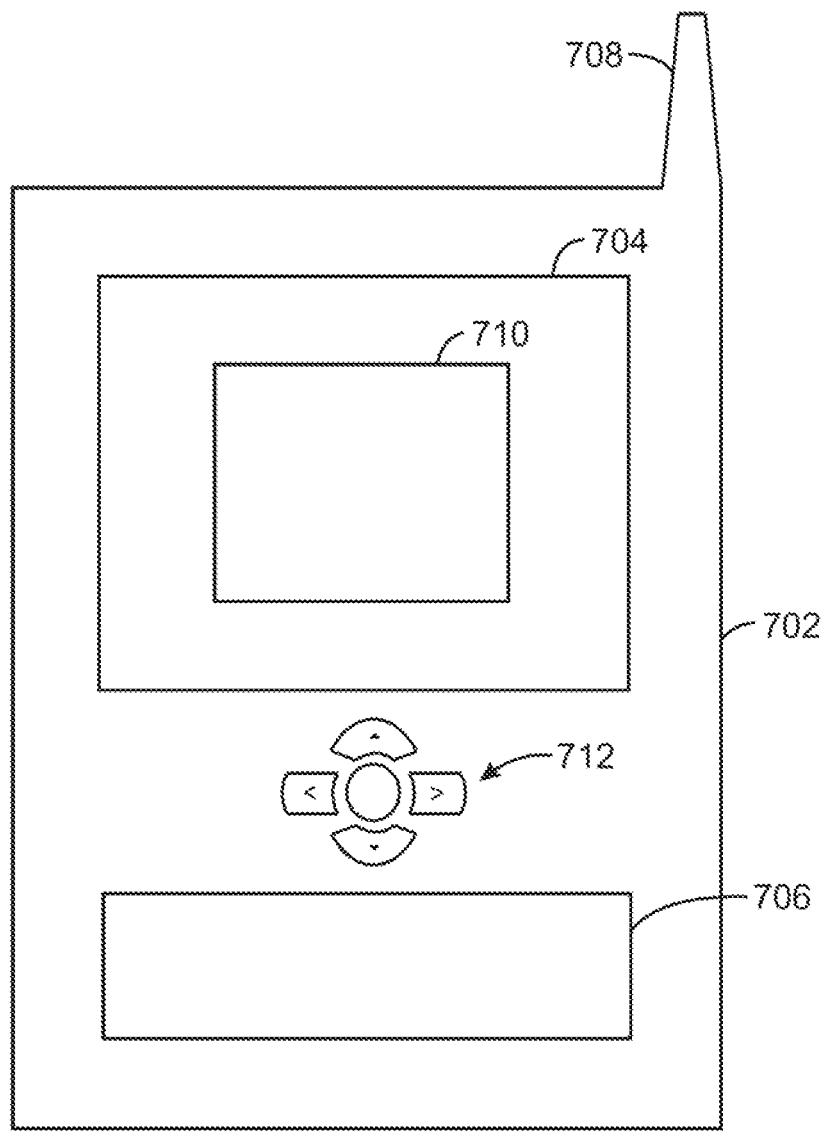
FIG. 7 is a schematic of a small form factor device 700 in which the system of FIG. 6 may be embodied.

FIG. 7 is a schematic of a small form factor device 700 in which the system 600 of FIG. 6 may be embodied. Like numbered items are as described with respect to FIG. 6. In some embodiments, for example, the device 700 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (, smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 7, the device 700 may include a housing 702, a display 704, an input/output (I/O) device 706, and an antenna 708. The device 700 may also include navigation features 710. The display 704 may include any suitable display unit for displaying information appropriate for a mobile computing device. The I/O device 706 may include any suitable I/O device for entering information into a mobile computing device. For example, the I/O device 706 may include an alphanumeric keyboard, a numeric keypad, a touch pad, input keys, buttons, switches, rocker switches, microphones, speakers, a voice recognition device and software, or the like. Information may also be entered into the device 700 by way of microphone. Such information may be digitized by a voice recognition device.

Example 1

A method for scheduling a media workload of a computing device is described herein. The method includes modeling a feature of the media workload. A GPU utilization rate and a memory bandwidth of the media workload may be determined. The method also includes scheduling the media workload by modifying the feature of the media workload in order to adjust the GPU utilization and the memory bandwidth.

The features of the media workload may be modeled in a media feature modeling database. The media workload may be converted to another format using a CODEC. Additionally, a kernel mode driver, GPU, and memory counter may be used to determine the GPU utilization rate and the memory bandwidth. The GPU utilization rate may be determined for each engine of the GPU. The media workload may be scheduled when the GPU utilization rate or the memory bandwidth is above a threshold. Adjusting the GPU utilization rate and the memory bandwidth provides dynamic control of the media workload, adjusting encoding and decoding of the media, and adjusting video playback.

Example 2

A computing device is described herein. The computing device includes a central processing unit (CPU) that is configured to execute stored instructions and a storage device that stores instructions. The storage device includes processor executable code that, when executed by the CPU, is configured to model a feature of the media workload using a media feature modeling database. A GPU utilization rate and a memory bandwidth of the media workload may be determined using a graphics processing unit (GPU) counter. The media workload may be scheduled by modifying the feature of the media workload in order to adjust the GPU utilization and the memory bandwidth.

The computing device may include a camera, a video chat application, or a video conferencing application. The processor executable code may be configured to schedule the media workload using a comparator that determines whether the GPU utilization rate or the memory bandwidth is above or below a threshold. The utilization rate may be determined for each GPU engine of a GPU. Additionally, a CODEC may be used to convert the media workload to another format for processing by a GPU. Furthermore, a kernel mode driver and a GPU with a GPU counter may be used to determine the GPU utilization rate and the memory bandwidth. Adjusting the GPU utilization rate and the memory bandwidth may include removing features from the media workload. The feature of the media workload may be modeled in a media feature modeling database of the computing device. The computing device of claim 9 may also include a radio and a display, and the radio and display may be communicatively coupled at least to the central processing unit.

Example 3

At least one non-transitory machine readable medium having instructions stored therein is described herein. In response to being executed on a computing device, the instructions cause the computing device to model a feature of the media workload. A GPU utilization rate and a memory bandwidth of the media workload may be determined. The media workload may be scheduled by modifying the feature of the media workload in order to adjust the GPU utilization and the memory bandwidth.

The media workload may be scheduled when the GPU utilization rate or the memory bandwidth is above a threshold. Furthermore, the media workload may be converted to another format using a CODEC. The feature of the media workload may be modeled in a media feature modeling database. Additionally, the GPU utilization rate may be determined for each engine of the GPU.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method for scheduling a media workload, comprising:
    modeling a feature of the media workload;
    determining a GPU utilization rate and a memory bandwidth of the media workload; and
    scheduling the media workload by modifying the feature of the media workload in order to adjust the GPU utilization and the memory bandwidth.

2. The method of claim 1, wherein the media workload is scheduled when the GPU utilization rate or the memory bandwidth is above a threshold.

3. The method of claim 1, wherein adjusting the GPU utilization rate and the memory bandwidth includes providing dynamic control of the media workload, adjusting encoding and decoding of the media, adjusting video playback, and adjusting parameters of video conferencing, camera functionality, or wireless display functionality.

4. The method of claim 1, wherein the feature of the media workload is modeled in a media feature modeling database.

5. The method of claim 1, comprising using a kernel mode driver, GPU, and memory counter to determine the GPU utilization rate and the memory bandwidth.

6. The method of claim 1, comprising determining the GPU utilization rate for each engine of the GPU.

7. The method of claim 1, comprising converting the media workload to another format using a CODEC.

8. A computing device, comprising:
a central processing unit (CPU) that is configured to execute stored instructions and a storage device that stores instructions, wherein the storage device includes processor executable code that, when executed by the CPU, is configured to:
model a feature of the media workload by use of a media feature modeling database;
determine a GPU utilization rate and a memory bandwidth of the media workload by use a graphics processing unit (GPU) counter; and
schedule the media workload by modification of the feature of the media workload in order to adjust the GPU utilization and the memory bandwidth.

9. The computing device of claim 8, wherein the media workload is scheduled using a comparator that is to determine whether the GPU utilization rate or the memory bandwidth is above or below a threshold.

10. The computing device of claim 8, wherein to adjust the GPU utilization rate and the memory bandwidth, the CPU is to remove features from the media workload.

11. The computing device of claim 8, wherein the CPU is to model a feature of the media workload in a media feature modeling database.

12. The computing device of claim 8, comprising a kernel mode driver and a GPU with a GPU counter that is to determine the GPU utilization rate and the memory bandwidth.

13. The computing device of claim 8, wherein the CPU is to determine utilization rate for each GPU engine of a GPU.

14. The computing device of claim 8, comprising a CODEC to convert the media workload to another format for a GPU to process.

15. The computing device of claim 8, wherein the computing device includes a camera, a video chat application, or a video conferencing application.

16. The computing device of claim 8, further comprising a radio and a display, the radio and display communicatively coupled at least to the CPU.

17. At least one non-transitory machine readable medium having instructions stored therein that, in response to being executed on a computing device, cause the computing device to:
model a feature of the media workload using a media feature modeling database;
determine a GPU utilization rate and a memory bandwidth of the media workload; and
schedule the media workload by modifying the feature of the media workload in order to adjust the GPU utilization and the memory bandwidth.

18. The at least one non-transitory machine readable medium of claim 17, wherein the media workload is scheduled when the GPU utilization rate or the memory bandwidth is above a threshold.

19. The at least one non-transitory machine readable medium of claim 17, wherein the feature of the media workload is modeled in a media feature modeling database.

20. The at least one non-transitory machine readable medium of claim 17, comprising determining the GPU utilization rate for each engine of the GPU.

* * * * *